United States Patent Office 3,331,840
Patented July 18, 1967

3,331,840
4-HYDROXY-PENTA-AZAINDENES
Douglas James Fry and Patrick Joseph Keogh, Ilford, England, assignors to Ilford Limited, Ilford, England, a British company
No Drawing. Filed Apr. 28, 1966, Ser. No. 545,877
Claims priority, application Great Britain, Jan. 16, 1963, 2,036/63
3 Claims. (Cl. 260—249.5)

This application is a continuation-in-part of our co-pending application Ser. No. 336,356, filed Jan. 8, 1964 and called "Heterocyclic Nitrogen Compounds, Their Production and Use."

This invention relates to penta-azaindene compounds, to their production and to their use as stabilizing agents for photographic emulsions.

The parent penta-azaindene is positionally numbered as follows:

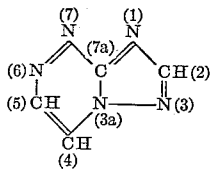

I

According to the present invention there is provided a new penta azaindene compound of the following general Formula II:

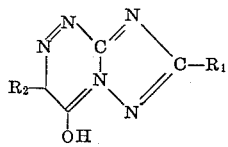

II where $R_1$ is a hydrogen atom or an alkyl, aralkyl, mercapto, alkylthio or aralkylthio group and $R_2$ is a hydrogen atom or an alkyl, aryl, aralkyl or alkoxy carbonyl group.

According to a further feature of the invention compounds of Formula II are made by the following methods:

(a) By reaction of a triazole of the general Formula III:

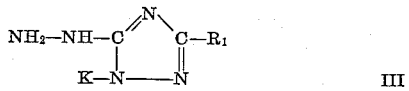

III where $R_1$ has the meaning assigned to it above with an α-keto acid or ester of general Formula IV:

$$R_2COCOOR_3 \qquad \qquad IV$$

where $R_2$ has the meaning assigned to it above and $R_3$ is a hydrogen atom or alkyl group, or with an acetal of an α-keto acid or ester of the general Formula V:

V where $R_2$ and $R_3$ have the meanings assigned to them above and $R_5$ is an ethyl group.

(b) For the production of a compound of Formula II where $R_1$ is an alkylthio or an aralkylthio group, by the reaction of a triazine of general Formula VI:

VI where $R_2$ has the meaning assigned to it above with alcoholic carbon disulphide in the presence of a tertiary organic base, preferably triethylamine, for a brief period whereby ideally no hydrogen sulphide is evolved and there is isolated the crude salt-like intermediate of general Formula VII:

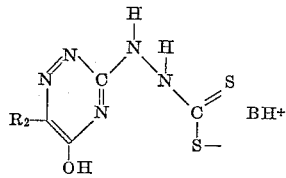

VII where B represents the residue of the base, reacting this product under basic conditions with two equivalents of alkylating or aralkylating agent to give a compound of the following Formula VIII:

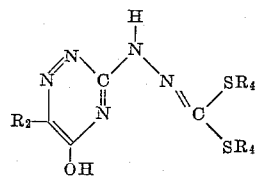

VIII where $R_4$ is an alkyl or aralkyl group and heating this product above its melting point or in refluxing acetic acid whereby it undergoes ring closure with evolution of $R_4SH$ accompanied by molecular rearrangement, to yield a compound of general Formula II where $R_1$ is an alkylthio or aralkylthio group.

(c) For the production of a compound of Formula II where $R_1$ is mercapto, by the reaction of a triazine of general Formula VI with alcoholic carbon disulphide in the presence of an alkali alkoxide (e.g. sodium ethoxide) until no further hydrogen sulphide is evolved and separating the desired product from the reaction mixture obtained.

(d) For the production of a compound of general Formula II where $R_1$ is a hydrogen atom by treatment of a compound of Formula II where $R_1$ is mercapto group with Raney nickel containing adsorbed hydrogen.

(e) For the production of a compound of Formula II where $R_1$ is alkylthio, by treatment of a compound of general Formula II where $R_1$ is a mercapto group with an excess of an alkyl iodide, the mixture being dissolved in a strong aqueous alcoholic solution and refluxed.

The products of the invention are photographically active as stabilisers for gelatino silver halide emulsions. An addition of a said compound in a proportion of 0.02 to 1.0 g. per 1.5 g. mols of silver iodobromode is typically sufficient.

The following examples will serve to illustrate the invention:

*Example 1.—Preparation of 2-methylthio-4-hydroxy-5-methyl-1,3,3a,6,7-penta-azaindene*

3-hydrazino-5-methylthio-1,2,4-triazole (2 g.) and ethyl pyruvate (1.6 ml.) were heated together in refluxing acetic acid (25 ml.) for 1½ hours. On cooling 2.0 g. crystals were collected which on recrystallisation from water gave colourless needles (1.6 g.) M.P. 259–260 with some sublimation at about 255° C.

The same compound was obtained in the following manner:

3-hydrazino-5-hydroxy - 6 - methyl-1,2,4-triazine (10 g.) was suspended in methanol (100 ml.) then triethylamine (20 g.) and carbon disulphide (8 g.) were added. The mixture was brought quickly to the boil and immediately all the suspended triazine had dissolved the methanol and excess reactants were distilled off under reduced pressure keeping the temperature as low as possible. The residue, consisting of the triethylamine salt of the dithiocarbazinic acid, was dissolved in water (60 ml.), 2.5 N sodium hydroxide solution (54 ml.) was added and the solution shaken with an excess of methyl iodide (28 g.). On cooling, yellow crystals (8.5 g.) separated which were collected and recrystallised from ethanol to give yellow powder (7 g.), M.P. 208–210° C. Analysis showed the product to be

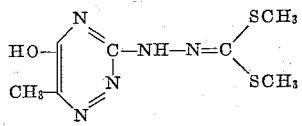

This compound on heating above its melting point or on heating in refluxing acetic acid underwent ring closure and the resulting product on recrystallisation was found to be identical both in M.P. and in its infra-red absorption spectrum with the product of the condensation between 3-hydrazino-5-methylthio-1,2,4-triazole and ethyl pyruvate in glacial acetic acid.

The product was added to silver iodobromide emulsion at the rate of 0.5 g. per 1½ g. mols silver halide and the emulsion coated on a support. A control coating was made with emulsion not containing the product. Specimens of the control and test coatings were tested for fog density and speed immediately after coating. Further specimens were stored in a sealed container for 14 days at 120° F. and 56% relative humidity, and the test for speed and fog density repeated. The following table shows the results obtained.

|  | Initial Test | | After 14 days at 120° F. | |
| --- | --- | --- | --- | --- |
|  | Fog density | Rel. log speed | Fog density | Rel. log speed |
| Control | 0.05 | 5.03 | 0.44 | 5.20 |
| Test | 0.04 | 4.89 | 0.07 | 5.00 |

The 3-hydrazino-5-mercapto-1,2,4-triazole was prepared as follows:

Bisthiourea monomethylether (Arndt & Milde, Ber., 54, 2096 (1921)), (164 g.) was suspended in water (1 litre) and hydrazine hydrate (50 ml. of 100%) added. The mixture was then heated: mercaptan was evolved and after about 10 minutes all the solid had dissolved. The solution was then refluxed for a further ½ hour during which time mercaptan and ammonia were evolved. On cooling a solid was precipitated which was filtered off after cooling to 5° C. and found to be 3,4-diamino-5-mercapto-1,2,4-triazole in 20% yield. The filtrate which was about pH=8.5 was then warmed to 25° C. and acidified with glacial acetic acid, whereupon a fine precipitate was obtained. This was filtered off after 5 minutes and found to be almost pure 3-hydrazino-5-mercapto-1,2,4-triazole in 20% yield. Further purification was made by dissolving the product in dilute sodium hydroxide solution and reprecipitation with acetic acid. The product had an infra-red absorption spectrum which was identical with that of a sample of 3-hydrazino-5-mercapto-1,2,4-triazole prepared from bisthiourea and a large excess of hydrazine according to the method described by Hoggarth, J. Chem. Soc. (1952), 4819.

The 3-hydrazino-5-methylthio-1,2,4-triazole was prepared as follows:

3-hydrazino-5-mercapto-1,2,4-triazole (10 g.) was dissolved in 2.5 N sodium hydroxide solution (33 ml.) containing a trace of sodium dithionite (approx. 0.5 g.). Methyl iodide (6 ml.) was added and the whole mixture shaken mechanically for 15 minutes. After cooling in ice the product was filtered off and recrystallised from spirit (15 ml.) (filtering off the spirit-insoluble starting material) to yield colourless crystals (5.0 g.) M.P. 154–156. (cf. Hoggarth, J. Chem. Soc. (1952), 4819, M.P. 154–156).

*Example II.—Preparation of 2-methylthio-4-hydroxy-5-phenyl-1,3,3a,6,7-penta-azaindene*

3-hydrazino-5-methylthio-1,2,4-triazole (1.6 g.) and ethyl phenylglyoxylate (2.2 g.) were reacted together in glacial acetic acid (10 ml.). Product separated on refluxing for 2 minutes. After refluxing for a further 3 minutes, the mixture was cooled and ether (100 ml.) added. The product was washed twice with ether by decantation and then recrystallised from ethanol (1.8 g. in 450 ml.) to yield thin colourless needles. (1.5 g.) M.P. 325–326° C.

Ultra-violet absorption in N/100 NaOH:
$\lambda_{max}$ in m$\mu$ ———————————— 243, 249, 334
log $\epsilon$ ———————————————— 4.32, 4.32, 4.21

Infra-red absorption in cm.$^1$ (in Nujol): 3200 (m), 1700 (s), 1625 (s), 1520 (m), 1440 (m), 1430 (m), 1295 (s), 1275 (s), 1180 (w), 925 (w), 790 (w), 725 (w), 690 (w).

*Example III.—Preparation of 2-mercapto-4-hydroxy-5-methyl-1,3,3a,6,7-penta-azaindene*

Sodium (2.2 g.) was dissolved in ethanol (200 ml.) and to the resulting solution 3-hydrazino-5-hydroxy-6-methyl-1,2,4-triazine (15 g.) and carbon disulphide (10 ml.) were added. The mixture was refluxed for 3 hours, during which time hydrogen sulphide was evolved and a crystalline solid formed. After cooling the mixture was filtered to yield solid (A) and filtrate (AF). Solid (A) was dissolved in water and the resulting solution acidified with concentrated hydrochloric acid, whereupon a yellow precipitate was obtained. This was filtered off and examination of its infra-red absorption spectrum showed it to be almost entirely 3-mercapto-6-hydroxy-5-methyl-1,2,3a,4,7-penta-azaindene (compare co-pending application No. 2,037/63 filed on even date herewith).

The filtrate (AF) was strongly acidified with concentrated hydrochloric acid and allowed to stand 1 hour. The precipitated solid (B) was filtered off, washed with a little water and then boiled with water (50 ml.) and filtered boiling hot to yield a residue (BR) consisting of and off-white crystalline powder (1.2 g.) M.P. 250–270 with decomposition and resolidification. The powder is 2-mercapto-4-hydroxy-5-methyl-1,3,3a,6,7-penta-azaindene.

Ultra-violet absorption in N/100 NaOH:

$\lambda_{max}$ in m$\mu$ ———————————————— 249, 322
log $\epsilon$ ————————————————————— 4.50, 4.02

Infra-red absorption in cm.$^{-1}$ (in Nujol): 3100 (w), 2450 (m), 1720 (s), 1630 (m), 1550 (w), 1510 (m), 1290 (s), 1275 (m), 945 (m), 825 (m), 747 (w), 725 (w).

*Example IV.—Preparation of 2-methylthio-4-hydroxy-5-methyl-1,3,3a,6,7-penta-azaindene*

0.3 g. of 2-mercapto-4-hydroxy-5-methyl-1,3,3a,6,7-penta-azaindene that is, residue (BR) of Example III, was dissolved in 50 ml. of a three to one mixture of methanol and water and boiled under reflux for 5 minutes with an excess of methyl iodide. On evaporation under reduced pressure to low bulk colourless crystals of an unstable hydriodide were obtained, which on recrystallisation from boiling water (30 ml.) yielded stable colourless needles of which the M.P. and infra-red absorption spectrum were identical to those of the product of Example 1.

Ultra-violet absorption in N/100 NaOH:

$\lambda_{max}$ in m$\mu$ ———————————————— 243, 316
log $\epsilon$ ————————————————————— 4.42, 4.08

Infra-red absorption in cm.$^{-1}$ (in Nujol): 1725 (s), 1630 (s), 1560 (w), 1510 (w), 1285 (s), 1250 (m), 830 (w), 750 (m), 730 (w).

*Example V.—Preparation of 4-hydroxy-5-methyl-1,3,3a, 6,7-penta-azaindene*

3-hydrazino-1,2,4-triazole hydrochloride (13.5 g.), pyridine (9 ml.) and ethyl pyruvate (15 ml.) were reacted together in refluxing glacial acetic acid (100 ml.) for ½ hour. The cooled reaction mixture was then poured into ethanol (150 ml.) and the resulting solution allowed to stand at 20° C. for 2 hours whereupon colourless crystals (12 g.) were obtained. Recrystallisation from ethanol (450 ml.) yielded large dense colourless crystals (10 g.) M.P. 262–264° C.

Ultra-violet absorption in N/100 NaOH:

$\lambda_{max}$ in m$\mu$ _____ 215, 260, 320
log $\epsilon$ _____ 4.20, 3.82, 4.05

Infra-red absorption in cm.$^{-1}$ (in Nujol): 3150 (m), 1720 (s), 1620 (s), 1560 (m), 1550 (m), 1360 (w), 1340 (w), 1260 (m), 1200 (s), 1140 (w), 1015 (w), 975 (w), 945 (w), 940 (w), 825 (s), 755 (s).

*Example VI.—Preparation of 2,5-dimethyl-4-hydroxy-1, 3,3a,6,7-penta-azaindene*

3-hydrazino-5-methyl-1,2,4-triazole hydrochloride (14.9 g.), pyridine (9 ml.) and ethyl pyruvate (15 ml.) were reacted together in refluxing glacial acetic acid (100 ml.) for ½ hour. The reaction mixture was then poured into ethanol (150 ml.) and the resulting solution allowed to stand at 20° C. for 2 hours, whereupon colourless crystals (12.5 g.) were obtained. Recrystallisation from ethanol (300 ml.) yielded colourless long needles (10 g.) M.P. 263–264° C.

Ultra-violet absorption in N/100 NaOH:

$\lambda_{max}$ in m$\mu$ _____ 216, 259, 316
log $\epsilon$ _____ 4.30, 3.76, 4.07

Infra-red absorption in cm.$^{-1}$ (in Nujol): 3050 (w), 1710 (s), 1645 (s), 1560 (w), 1540 (w), 1500 (m), 1440 (m), 1420 (m), 1340 (w), 1320 (s), 1260 (m), 1150 (w), 995 (m), 965 (w), 865 (m), 830 (m), 755 (s), 725 (w).

*Example VII.—Preparation of 4-hydroxy-2-methylthio-1, 3,3a,6,7-penta-azaindene*

3-hydrazino-5-methylthio-1,2,4-triazole (11 g.) and ethyl glyoxylate (11 ml. crude) were reacted together in hot glacial acetic acid (15 ml.) for 10 minutes on a steam-bath. The resulting semi-solid mass on filtration yielded the intermediate of general Formula VIII ($R_1$=CH$_3$S, $R_2$=H, $R_3$=C$_2$H$_5$)

Cyclisation was effected by further boiling under reflux in glacial acetic acid (100 ml.) for 2 hours. The reaction mixture was then cooled and added to ether (500 ml.) whereupon the crude product was precipitated (9 g.). Recrystallisation from ethanol (120 ml.) yielded fine colourless needles (6.5 g.) M.P. 233–236° C.

Ultra-violet absorption in N/100 NaOH:

$\lambda_{max}$ in m$\mu$ _____ 241, 315
log $\epsilon$ _____ 4.42, 4.07

Infra-red absorption in cm.$^{-1}$ (in Nujol): 3100 (m), 1720 (m), 1680 (s), 1620 (s), 1420 (m), 1320 (w), 1270 (m), 1260 (s), 1140 (w), 910 (w), 900 (m), 733 (m), 720 (m).

*Example VIII.—Preparation of 4-hydroxy-1,3,3a,6,7-penta-azaindene*

3-hydrazino-1,2,4-triazole hydrochloride (13.5 g.), pyridine (10 ml.) and ethyl diethoxyacetate (17.6 g. crude) were reacted together in refluxing glacial acetic acid (100 ml.) for 3 hours. At the end of the reaction time the acetic acid was removed by distillation under reduced pressure. The residue on treatment with ether gave a syrupy solid which was dissolved by warming in ethanol (50 ml.). On standing the resulting solution overnight at 0° C. about 10 g. of crystals were produced. Recrystallisation from ethanol (100 ml.) yielded a pinkish amorphous powder (2.0 g.) M.P. 250–256° C.

3-hydrazino-1,2,4-triazole hydrochloride (10.5 g.) dissolved in a mixture of acetic acid (30 ml.) and water (60 ml.) warmed to 40° C. was treated with a solution of glyoxylic acid hydrate (10.5 g.) dissolved in water (30 ml.). There occurred an immediate precipitation of the intermediate of general Formula VIII ($R_1$, $R_2$ and $R_3$=H). The semi-solid mixture was allowed to stand for 10 minutes after which the intermediate was collected. The damp intermediate (13.5 g.) was then suspended in glacial acetic acid (150 ml.) and boiled under reflux for 40 minutes, during the first 25 minutes of which time acetic anhydride (20 ml.) was added in 4 ml. portions every 5 minutes. At the end of the reaction time the now homogeneous solution was reduced to half volume by distillation under reduced pressure. After cooling the resulting solution, product (6.5 g.) was collected. Recrystallisation from ethanol (180 ml.) yielded an off-white amorphous powder (4.0 g.) M.P. 255–257° C.

The infra-red absorption spectra of both products showed them to be identical in structure.

Ultra-violet absorption in N/100 NaOH:

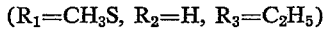
$\lambda_{max}$ in m$\mu$ _____ 213.5, 258, 315
log $\epsilon$ _____ 4.14, 3.75, 4.03

Infra-red absorption in cm.$^{-1}$ (in Nujol): 3250 (m), 1700 (s), 1600 (s), 1525 (m), 1330 (w), 1260 (w), 1200 (w), 1160 (w), 1080 (w), 885 (w), 740 (w).

*Example IX.—Preparation of 4-hydroxy-2-methyl-1,3,3a,6,7-penta-azaindene*

3-hydrazino-5-methyl-1,2,4-triazole hydrochloride (14.7 g.) pyridine (10 ml.) and ethyl diethoxyacetate (17.6 g. crude) were reacted together in refluxing glacial acetic acid (100 ml.) for 4½ hours. At the end of the reaction time the acetic acid was removed by distillation under reduced pressure. The residue on treatment with ether gave a syrupy solid which was dissolved by warming in ethanol (50 ml.). After standing the resultant solution at 20° C. for ½ hour, crystals (10 g.) were collected. Recrystallisation from acetic acid (25 ml.) and further recrystallisation from ethanol (25 ml.) yielded off-white crystals (2 g.) M.P. 213–215° C.

3-hydrazino-5-methyl-1,2,4-triazole hydrochloride (11.5 g.) dissolved in a mixture of acetic acid (20 ml.) and water (60 ml.) at 60° C., was treated with a solution of glyoxylic acid hydrate (10.5 g.) dissolved in water. The precipitated intermediate of general Formula VIII ($R_1$=CH$_3$, $R_2$ and $R_3$=H) was collected and dried by suspending in boiling glacial acetic acid for 1 minute, filtering hot and washing with ether. The dried intermediate (10 g.) was then suspended in a mixture of glacial acetic acid (100 ml.) and acetic anhydride (10 ml.) and boiled under reflux for 20 minutes. At the end of the reaction time the homogeneous solution was evaporated to dryness by distillation under reduced pressure. After treating the residue with ethanol (25 ml.), product (4.5 g.) was collected. Recrystallisation from ethanol (40 ml.) yielded an off-white amorphous powder (2.1 g.) M.P. 215–216° C.

The infra-red absorption spectra of both products showed them to be identical in structure.

Ultra-violet absorption in N/100 NaOH:

$\lambda_{max}$ in m$\mu$ _____ 215, 257, 316
log $\epsilon$ _____ 4.22, 3.69, 4.05

Infra-red absorption in cm.$^{-1}$ (in Nujol): 3250 (m), 3150 (m), 1720 (s), 1620 (m), 1540 (m), 1520 (m), 1440 (m), 1330 (m), 1310 (m), 1140 (w), 910 (w), 785 (w), 735 (w).

*Example X.—Preparation of 4-hydroxy-5-phenyl-1,3,3a,6,7-penta-azaindene*

3-hydrazino-1,2,4-triazole hydrochloride (2.6 g.) pyridine (1.8 ml.) and ethyl phenylglyoxylate (4.0 g.) were reacted together in refluxing glacial acetic acid (10 ml.) for ½ hour. The cooled reaction mixture was then treated with cold ethanol (5 ml.) and the product (3.2 g.) filtered off. Recrystallisation from ethanol (100 ml.) yielded colourless dense hexagonal plates (2.5 g.) M.P. 243–245° C.

Ultra-violet absorption in N/100 NaOH:

$\lambda_{max}$ in m$\mu$ _____ 215, 278, 334
log $\epsilon$ _____ 4.21, 4.03, 4.20

Infra-red absorption in cm.$^{-1}$ (in Nujol): 3150 (w), 1730 (s), 1635 (s), 1535 (m), 1515 (m), 1300 (w), 1270 (w), 1195 (m), 1160 (w), 1150 (w), 920 (w), 795 (m), 785 (m), 725 (w), 703 (m).

*Example XI.—Preparation of 2-methylthio-4-hydroxy-5-methyl-1,3,3a,6,7-penta-azaindene*

3-hydrazino-5-methylthio-1,2,4-triazole (6.0 g.) dissolved in warm ethanol (150 ml.) was reacted with pyruvic acid (4.0 g.) dissolved in water (40 ml.). After standing the reaction mixture for 2 hours, the intermediate of general Formula VIII ($R_1=CH_3S$, $R_2=CH_3$, $R_3=H$) was collected and dried. Yield 8.2 g. M.P. 211° C. with decomposition and resolidification, remelting at about 250° C. This intermediate underwent cyclisation either on heating above its melting point or on heating in refluxing acetic acid in the following manner .

Finely ground intermediate (1.65 g.) was heated at 220° C. for 20 minutes, during which time the solid melted, gave off water and resolidified. Recrystallisation from ethanol yielded needles (0.65 g.) M.P. 257° C.

Intermediate (2.0 g.) was suspended in boiling glacial acetic acid (15 ml.) under reflux for 2½ hours, during which time it gradually dissolved. On cooling, the product crystallised out and was collected. Recrystallisation from ethanol yielded colourless needles (1.2 g.) M.P. 259° C.

The infra-red absoprtion spectra of both products showed them to be identical in structure to the compound described in Example I.

The products from Examples II, III, V, VI, VII, and X were tested in a silver iodobromide emulsion as for the product from Example I and the results are given in the following table:

| | Quantity | Initial test | | After 14 days at 120° F. | |
|---|---|---|---|---|---|
| | | Fog density | Rel. log speed | Fog density | Rel. log speed |
| Control | Nil | 0.14 | 4.91 | 0.48 | 4.78 |
| Example II | 0.5 | 0.05 | 4.8 | 0.08 | 4.98 |
| Control | Nil | 0.14 | 4.91 | 0.48 | 4.78 |
| Example III | .02 | 0.09 | 4.78 | 0.15 | 4.88 |
| | 0.1 | 0.04 | 4.62 | 0.04 | 4.66 |
| Control | Nil | 0.26 | 4.86 | 0.66 | 4.87 |
| Example V | 0.5 | 0.19 | 4.84 | 0.31 | 4.95 |
| Control | Nil | 0.26 | 4.86 | 0.66 | 4.87 |
| Example VI | 0.5 | 0.16 | 4.86 | 0.23 | 4.98 |
| Control | Nil | 0.14 | 4.91 | 0.48 | 4.78 |
| Example VII | 0.5 | 0.07 | 4.88 | 0.25 | 4.94 |
| Control | Nil | 0.26 | 4.86 | 0.66 | 4.87 |
| Example X | 0.5 | 0.15 | 4.81 | 0.41 | 4.87 |

*Example XII.—Preparation of 5-methyl-4-hydroxy-1,3,3a,6,7-penta azaindene*

A solution of 2-mercapto-5-methyl-4-hydroxy-1,3,3a,6,7-penta azaindene (0.5 g.) in ammonium hydroxide (3 ml. of S.G. 0.920) and water (30 ml.) was treated in the cold with Raney nickel (approx. 2.5 g.) in five portions over a period of half an hour, the mixture being stirred vigorously all the time. The now colourless solution was filtered free of the solids and the clear filtrate was evaporated to dryness under reduced pressure. The residue on treatment with water (5 ml.) gave a cloudy solution which was set aside after acidification with a few drops of concentrated hydrochloric acid. After one hour, the dense salt-like crystals which had formed were filtered off (about 0.2 g.), M.P. 260–262° C. Examination of their infra-red absorption spectra showed them to be identical to those of the product of Example V.

The progress and result of the desulpharisation of the mercapto compound was investigated with the aid of paper electrophoresis using a pH 4 buffer solution as supporting electrolyte and examining the strips under U.V. light. The almost stationary dark spot of the mercapto compound was gradually replaced by a single spot which exhibited a bluish fluorescence and migrated at the same rate towards the cathode as did the control spot of the product of Example V, which likewise exhibited a fluorescence of the same hue.

*Example XIII.—Preparation of 2-mercapto-5-phenyl-4-hydroxy-1,3,3a,6,7-penta azaindene*

Sodium (7.7 g.) was dissolved in ethanol (1400 ml.) and to the resulting solution 3-hydrazino-5-hydroxy-6-phenyl-1,2,4-triazine (73 g.) and carbon disulphide (35 ml.) were added. The mixture was boiled under reflux for 2 hours, during which time hydrogen sulphide was evolved and a crystalline solid formed. The reaction mixture was then filtered hot to give solid (A) and filtrate (AF). Solid (A) on appropriate treatment yielded a yellow solid which from examination of its infra-red absorption spectra was shown to consist almost entirely of 3-mercapto-5-phenyl-6-hydroxy-1,2,3a,4,7-penta azaindene.

The filtrate (AF) was evaporated down under reduced pressure to a low volume and ether added to it to precipitate the sodium salt of the desired product. The latter was filtered off, dissolved in water and the filtered solution acidified with concentrated hydrochloric acid to yield the crude mercapto compound (28 g.) which was filtered off. Three recrystallisations from methanol (28 g. from 3 litres, 9.5 g. from 2 litres and 7.5 g. from 2 litres consecutively) yielded a pale yellow crystalline powder (4.5 g.) which decomposed at 256° C.

*Example XIV.—Preparation of 2-benzyl-5-methyl-4-hydroxy-1,3,3a,6,7-penta azaindene*

3-hydrazino-5-benzyl-1,2,4-triazole hydrochloride (7.0 g.), pyridine (2.7 ml.) and ethyl pyruvate (5.5 ml.) were reacted together in boiling glacial acetic acid (20 ml.) for 2 hours. After evaporating down under reduced pressure to dryness, the residue was recrystallised from water (40 ml.) to yield crude product (5.5 g.). Recrystallisation from ethanol (150 ml.) yielded colourless long needles (3.5 g.), M.P. 241.5–242.5° C.

*Example XV.—Preparation of 2-methylthio-5-carbethoxy-4-hydroxy-1,3,3a,6,7-penta azaindene*

3-hydrazino-5-methylthio-1,2,4-triazole (8 g.) and diethyl ketomalonate (10 ml.) were reacted together in boiling glacial acetic acid (20 ml.) for 2 hours. After evaporating down under reduced pressure to dryness, the residue was treated with trichlorethylene (50 ml.) and the crude product (10.5 g.) was filtered off. A methylene chloride insoluble material was removed by dissolving the crude product in cold methylene chloride (q.s.) and evaporating the filtered solution to dryness. Three recrystallisations from ethanol (50 ml.) yielded colourless needles (5 g.), M.P. 167.5–168° C.

*Example XVI.—Preparation of 2-benzylthio-5-methyl-4-hydroxy-1,3,3a,6,7-penta azaindene*

2-mercapto-5-methyl-4-hydroxy - 1,3,3a,6,7 - penta azaindene (4 g.) and benzyl bromide (10 ml.) were reacted together in boiling ethanol (150 ml.) for 30 minutes. After cooling the reaction mixture, the crude product (5 g.) was filtered off. Three recrystallisations from ethanol (400 ml., 330 ml. and 270 ml. consecutively) yielded a colourless crystalline powder (2 g.), M.P. 214–214.5° C.

*Example XVII.—Preparation of 2-methylthio-5-benzyl-4-hydroxy-1,3,3a,6,7-penta azaindene*

3-hydrazino-5-methylthio-1,2,4-triazole (2.9 g.) and ethyl phenylpyruvate (5 ml.) were reacted together in boiling glacial acetic acid (5 ml.). The reaction vessel was heated by the vapours of boiling amyl alcohol. After heating for five minutes the product crystallised out. After boiling for a further five minutes, the reaction mixture was allowed to cool slightly and methanol (50 ml.) was added and the crude product (3.5 g.) was filtered off. Recrystallisation from ethanol (1 litre used five times) gave five identical crops of colourless fluffy needles (2.8 g.), M.P. 317–317.5° C.

*Example XVIII.—Preparation of 5-carbethoxy-4-hydroxy-1,3,3a,6,7-penta azaindene*

3-hydrazino - 1,2,4-triazole hydrochloride (13.5 g.), pyridine (9 ml.) and diethyl ketomalonate (20 g.) were reacted together in boiling glacial acetic acid (30 ml.) for 1½ hours. A methylene chloride insoluble material was removed by adding the cooled reaction mixture to methylene chloride (300 ml.) and cooling to 0° C. The clear filtered solution was then evaporated to dryness under reduced pressure and the residue boiled out with ethanol (50 ml.) to yield off-white crude product (8.5 g.). Two recrystallisations from ethanol (250 ml. plus decolourising charcoal, and 200 ml. consecutively) yielded colourless large needles (5.5 g.), M.P. 221–222° C.

*Example XIX.—Preparation of 5-benzyl-4-hydroxy-1,3,3a,6,7-penta azaindene*

3-hydrazino-1,2,4-triazole hydrochloride (1.3 g.), pyridine (1.0 ml.) and ethyl phenylpyruvate (3 ml.) were reacted together in boiling glacial acetic acid (10 ml.) for 3 hours. The slightly cooled reaction mixture was treated with benzene (30 ml.) and after further cooling the crude product (2 g.) was filtered off. Recrystallisation from ethanol (80 ml.) yielded colourless short needles, M.P. 227.5–228.5° C.

We claim as our invention:
1. A penta-azaindene of the formula

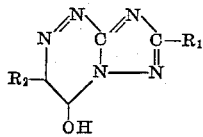

where $R_1$ is selected from the class consisting of hydrogen, alkyl, aralkyl, mercapto, alkylthio and aralkylthio and $R_2$ is selected from the class consisting of hydrogen, alkyl, aryl, aralkyl and alkoxycarbonyl.

2. A penta-azaindene according to claim 1 selected from the class consisting of 2-methylthio-4-hydroxy-5-methyl-1,3,3a,6,7-penta-azaindene,
2-methylthio-4-hydroxy-5-phenyl-1,3,3a,6,7-penta-azaindene,
2-mercapto-4-hydroxy-5-methyl-1,3,3a,6,7-penta-azaindene,
4-hydroxy-5-methyl-1,3,3a,6,7-penta-azaindene,
2,5-dimethyl-4-hydroxy-1,3,3a,6,7-penta-azaindene,
4-hydroxy-2-methylthio-1,3,3a,6,7-penta-azaindene,
4-hydroxy-1,3,3a,6,7-penta-azaindene,
4-hydroxy-2-methyl-1,3,3a,6,7-penta-azaindene,
4-hydroxy-5-phenyl-1,3,3a,6,7-penta-azaindene,
2-mercapto-5-phenyl-4-hydroxy-1,3,3a,6,7-penta-azaindene,
2-benzyl-5-methyl-4-hydroxy-1,3,3a,6,7-penta-azaindene,
2-methylthio-5-carbethoxy-4-hydroxy-1,3,3a,6,7-penta-azaindene,
2-benzylthio-5-methyl-4-hydroxy-1,3,3a,6,7-penta-azaindene,
2-methylthio-5-benzyl-4-hydroxy-1,3,3a,6,7-penta-azaindene,
5-carbethoxy-4-hydroxy-1,3,3a,6,7-penta-azaindene,
5-benzyl-4-hydroxy-1,3,3a,6,7-penta-azaindene.

3. A process for the production of a penta-azaindene of the formula:

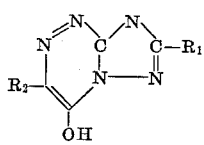

where $R_1$ is selected from the class consisting of hydrogen, alkyl, aralkyl, mercapto, alkylthio and aralkylthio and $R_2$ is selected from the class consisting of hydrogen, alkyl, aryl, aralkyl and alkoxycarbonyl which comprises reacting a triazole of the formula:

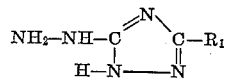

where $R_1$ has the meaning assigned to it above, with a compound of the formula $R_2 COCOOR_3$ where $R_2$ has the meaning assigned to it above and $R_3$ is selected from the class consisting of hydrogen and alkyl.

No references cited.

NORMAN G. TORCHIN, *Primary Examiner.*
JOHN RAUBITSCHEK, *Assistant Examiner.*